US012795329B2

(12) United States Patent

Zhao et al.

(10) Patent No.: US 12,795,329 B2
(45) Date of Patent: Nov. 10, 2026

(54) POSITIONING METHOD, TERMINAL DEVICE, AND NETWORK DEVICE

(71) Applicant: QUECTEL WIRELESS SOLUTIONS CO., LTD., Shanghai (CN)

(72) Inventors: Zheng Zhao, Shanghai (CN); Ling Lyu, Shanghai (CN); Zhongzhi Yang, Shanghai (CN)

(73) Assignee: QUECTEL WIRELESS SOLUTIONS CO., LTD., Shanghai (CN)

( * ) Notice: Subject to any disclaimer, the term of this patent is extended or adjusted under 35 U.S.C. 154(b) by 0 days.

(21) Appl. No.: 19/419,394

(22) Filed: Dec. 15, 2025

(65) Prior Publication Data

US 2026/0107110 A1 Apr. 16, 2026

Related U.S. Application Data

(63) Continuation of application No. 19/030,436, filed on Jan. 17, 2025, now Pat. No. 12,501,235, which is a continuation of application No. PCT/CN2023/096560, filed on May 26, 2023.

(30) Foreign Application Priority Data

Oct. 28, 2022 (CN) ......................... 202211338326.6

(51) Int. Cl.

| | |
|---|---|
| ***H04W 4/02*** | (2018.01) |
| ***H04B 17/318*** | (2015.01) |
| ***H04W 64/00*** | (2009.01) |
| ***H04W 74/0833*** | (2024.01) |

(52) U.S. Cl.

CPC .......... *H04W 4/026* (2013.01); *H04B 17/328* (2023.05); *H04W 4/023* (2013.01); *H04W 64/006* (2013.01); *H04W 74/0833* (2013.01)

(58) Field of Classification Search

CPC ... H04W 4/026; H04W 4/023; H04W 64/006; H04W 74/0833; H04B 17/328

See application file for complete search history.

(56) References Cited

U.S. PATENT DOCUMENTS

| | | | | |
|---|---|---|---|---|
| 10,368,373 | B2 | 7/2019 | Nagaraja et al. | |
| 2017/0223690 | A1 | 8/2017 | Zeng et al. | |
| 2017/0223744 | A1 | 8/2017 | Qian et al. | |
| 2020/0107288 | A1* | 4/2020 | Kumar | H04B 7/088 |
| 2020/0145977 | A1* | 5/2020 | Kumar | G01S 5/0063 |

(Continued)

FOREIGN PATENT DOCUMENTS

WO WO 2021032267 A1 2/2021

OTHER PUBLICATIONS

3GPP TR 38.802 "Study on New Radio Access Technology Physical Layer Aspects" (Year: 2017).*

(Continued)

*Primary Examiner* — Jinsong Hu
*Assistant Examiner* — Justin Barry
(74) *Attorney, Agent, or Firm* — Fish & Richardson P.C.

(57) ABSTRACT

This present disclosure provides a positioning method, a terminal device, and a network device. One example method includes: acquiring, by a terminal device, first information in an initial access process, where the first information is used to position the terminal device, and the first information is associated with direction information of the terminal device relative to a base station.

20 Claims, 3 Drawing Sheets

(56) References Cited

U.S. PATENT DOCUMENTS

| | | | | |
|---|---|---|---|---|
| 2020/0187172 | A1 | 6/2020 | Wang et al. | |
| 2021/0368470 | A1* | 11/2021 | Schaepperle ......... | H04W 64/00 |
| 2022/0345185 | A1* | 10/2022 | Michalopoulos .... | H04B 7/0408 |
| 2023/0164839 | A1 | 5/2023 | Myung et al. | |

OTHER PUBLICATIONS

"NR SSB Beam Sweeping" MATLAB <https://web.archive.org/web/20220415193936/https://www.mathworks.com/help/5g/ug/nr-ssb-beam-sweeping.html> (Year: 2022).*

Grabowski, "Triangulation Using FM Stations" U.S. AF Summer Research Program Final Reports, [retrieved on Jun. 8, 2026] <https://apps.dtic.mil/sti/tr/pdf/ADA356737.pdf> (Year: 1993).*

Pages-Zamora, et al., "Closed-form solution for positioning based on angle of arrival measurements" IEEE (Year: 2002).*

Stansfield, "Statistical Theary of D.F. Fixing" Ministry of Works (Year: 1947).*

Extended European Search Report in European Appln. No. 23881203.6-1206, mailed on Jan. 26, 2026, 12 pages.

* cited by examiner

POSITIONING METHOD, TERMINAL DEVICE, AND NETWORK DEVICE

CROSS-REFERENCE TO RELATED APPLICATIONS

This application is a continuation of U.S. application Ser. No. 19/030,436, filed on Jan. 17, 2025, which is a continuation application of International Patent Application No. PCT/CN2023/096560, filed on May 26, 2023, which claims priority to Chinese Patent Application No. 202211338326.6, filed Oct. 28, 2022. All of the afore-mentioned patent applications are hereby incorporated by reference in their entireties.

TECHNICAL FIELD

This present disclosure relates to the technical field of communications, and in particular, to a positioning method, a terminal device and a network device.

BACKGROUND

Currently, the terminal device can be located based on direction information of a base station relative to the terminal device (for example, angle-of-arrival (AOA) information). However, the foregoing positioning information is necessarily obtained in a manner in which the terminal device enters a radio resource control (RRC) connected state, which is not conducive to reducing a positioning delay.

SUMMARY

Embodiments of this present disclosure provide a positioning method, a terminal device, and a network device. The following separately describes the aspects involved in the embodiments of this present disclosure.

According to a first aspect, a positioning method is provided, including: acquiring, by a terminal device, first information in an initial access process, where the first information is used to position the terminal device, and the first information is associated with direction information of the terminal device relative to a base station.

According to a second aspect, a positioning method is provided, including: sending, by a base station, second information in an initial access process to a terminal device, where the second information is used to determine first information, the first information is used to locate the terminal device, and the first information is associated with direction information of the terminal device relative to the base station.

According to a second aspect, a positioning method is provided, including: receiving, by a positioning device, an index of a first SSB sent by a terminal device, where the index of the first SSB is obtained by the terminal device performing measurement for a serving cell; determining, by the positioning device based on the index of the first SSB and a first correspondence, a first angle of the terminal device relative to a base station of the serving cell, where the first correspondence comprises a correspondence between an SSB index of the serving cell and an SSB beam direction; receiving, by the positioning device, an index of a second SSB sent by the terminal device, where the index of the second SSB is obtained by the terminal device performing measurement for a neighboring cell; determining, by the positioning device based on the index of the second SSB and a second correspondence, a second angle of the terminal device relative to a base station of the neighboring cell, where the second correspondence comprises a correspondence between an SSB index of the neighboring cell and the SSB beam direction; and determining, by the positioning device, location information of the terminal device based on the first angle, the second angle, location information of the base station of the serving cell, and location information of the base station of the neighboring cell.

According to a fourth aspect, a terminal device is provided, including: an acquiring unit, configured to acquire first information in an initial access process, where the first information is used to locate the terminal device, and the first information is associated with direction information of the terminal device relative to a base station.

According to a fifth aspect, a network device is provided. The network device is a base station and includes: a sending unit, configured to send second information in an initial access process to a terminal device. The second information is used to determine first information, the first information is used to locate the terminal device, and the first information is associated with direction information of the terminal device relative to the base station.

According to a sixth aspect, a positioning device is provided, including: a receiving unit, configured to receive an index of a first SSB sent by a terminal device, where the index of the first SSB is an SSB index obtained by the terminal device performing measurement for the serving cell; and a determining unit, configured to determine, based on the index of the first SSB and a first correspondence, a first angle of the terminal device relative to a base station of the serving cell, where the first correspondence includes a correspondence between an SSB index of the serving cell and an SSB beam direction. The receiving unit is configured to an index of a second SSB sent by the terminal device, where the index of the second SSB is obtained by the terminal device performing measurement for a neighboring cell. The determining unit is configured to determine, based on the index of the second SSB and a second correspondence, a second angle of the terminal device relative to a base station of the neighboring cell, where the second correspondence includes a correspondence between an SSB index of the neighboring cell and the SSB beam direction; and determine location information of the terminal device based on the first angle, the second angle, location information of the base station of the serving cell, and location information of the base station of the neighboring cell.

According to a seventh aspect, a terminal device is provided, including a processor and a memory, where the memory is configured to store one or more computer programs, and the processor is configured to invoke the computer program in the memory so that the terminal device performs some or all of the steps in the method in the first aspect.

According to an eighth aspect, a network device is provided, including a transceiver, a processor, and a memory, where the memory is configured to store one or more computer programs, and the processor is configured to invoke the computer program in the memory so that the network device performs some or all of the steps in the method in the second aspect.

According to a ninth aspect, a positioning device is provided, including a transceiver, a processor, and a memory, where the memory is configured to store one or more computer programs, and the processor is configured to invoke the computer program in the memory so that the network device performs some or all of the steps in the method in the third aspect.

According to a tenth aspect, an embodiment of this present disclosure provides a communications system, where the system includes the foregoing terminal device and/or the network device. In another possible embodiments, the system may further include another device that interacts with the terminal device or the network device in the solution provided in the above aspects of this present disclosure.

According to an eleventh aspect, an embodiment of this present disclosure provides a computer readable storage medium, where the computer readable storage medium stores a computer program, and the computer program causes a terminal to perform some or all of the steps in the methods in any one of the first aspect to the third aspect.

According to a twelfth aspect, an embodiment of this present disclosure provides a computer program product, where the computer program product includes a non-transitory computer readable storage medium that stores a computer program, and the computer program may be operated to enable a terminal to perform some or all of the steps of the method in any one of the first aspect to the third aspect. In some implementations, the computer program product may be a software installation package.

According to a thirteenth aspect, an embodiment of this present disclosure provides a chip, where the chip includes a memory and a processor, and the processor may invoke and run a computer program from the memory, so as to implement some or all of the steps described in the method in any one of the first aspect to the third aspect.

Based on the foregoing technical solution, the terminal device can acquire, in an initial access process, the first information associated with the direction information of the terminal device relative to the base station. That is, the terminal device can acquire the first information before switched to the RRC connected state, thereby reducing a delay of acquiring the direction information by the terminal device, and reducing a positioning delay.

DETAILED DESCRIPTION OF THE EMBODIMENTS

The following clearly and completely describes the technical solutions in the embodiments of this present disclosure with reference to the accompanying drawings in the embodiments of this present disclosure. Apparently, the described embodiments are only some rather than all of the embodiments of this present disclosure.

The following describes the technical solutions in this present disclosure with reference to the accompanying drawings.

Figure 1:
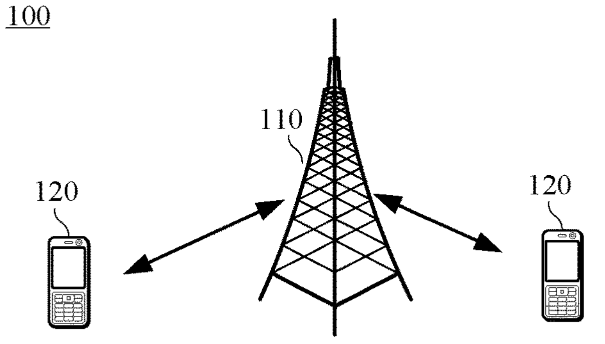
FIG. 1 illustrates a wireless communications system applied in embodiments of this present disclosure.

FIG. 1 illustrates a wireless communications system 100 applied to the embodiments of this present disclosure. The wireless communications system 100 includes a network device 110 and a terminal device 120. The network device 110 may be a device that communicates with the terminal device 120. The network device 110 may provide communication coverage for a specific geographical area, and may communicate with the terminal device 120 located inside the coverage area.

FIG. 1 exemplarily shows one network device and two terminals. Optionally, the wireless communications system 100 may include multiple network devices, and a coverage range of each network device may include another quantity of terminal devices. This is not limited in this embodiment of this present disclosure.

Optionally, the wireless communications system 100 may further include another network entity such as a network controller and a mobility management entity. This is not limited in this embodiment of this present disclosure.

It should be understood that the technical solutions in the embodiments of this present disclosure may be applied to various communications systems, for example, a 5th generation (5G) system or a new radio (NR), a long-term evolution (LTE) system, an LTE frequency division duplex (FDD) system, and an LTE time division duplex (TDD). The technical solutions provided in this present disclosure may further be applied to future communications systems, such as a 6th-generation mobile communications system or a satellite communications system.

The terminal device in the embodiments of this present disclosure may also be referred to as user equipment (UE), an access terminal, a user unit, a user station, a mobile station, a mobile station (MS), a mobile terminal (MT), a remote station, a remote terminal, a mobile device, a user terminal, a terminal, a wireless communications device, a user agent, or a user apparatus. The terminal device in the embodiments of this present disclosure may be a device that provides voice and/or data connectivity to a user, and may be configured to connect a person, a thing, and a machine, for example, a handheld device and an in-vehicle device that have a wireless connection function. The terminal device in the embodiments of this present disclosure may be a mobile phone, a Pad, a notebook computer, a laptop computer, a mobile internet device (MID), a wearable device, a virtual reality (VR) device, an augmented reality (AR) device, a wireless terminal in industrial control, a wireless terminal for self-driving, a wireless terminal in a remote medical surgery, a wireless terminal in a smart grid, a wireless terminal in a transportation safety, a wireless terminal in a smart city, a wireless terminal in a smart home, or the like. Optionally, the UE may be configured to serve as a base station.

It should be further understood that, in the embodiments of this present disclosure, the terminal may include but is not limited to a terminal device applied to the Internet of Things. For example, the terminal device may be a terminal device (which may be referred to as a "NB-IoT terminal") that accesses the NB-IoT, such as an intelligent meter reading device, a logistics tracing device, an environment monitoring device.

The network device in the embodiments of this present disclosure may be a device for communicating with a terminal device, and the network device may also be referred to as an access network device or a radio access network device. For example, the network device may be a base station. The network device in the embodiments of this present disclosure may be a radio access network (RAN) node (or device) that accesses a radio network via a terminal device. The base station may broadly cover various names in or replace with the following names: a NodeB, an evolved NodeB (eNB), a next-generation base station (next generation NodeB, gNB), a relay station, an access point, a transmission point (transmitting and receiving point, TRP), a transmitting point (TP), a master station MeNB, a secondary station SeNB, a multimode radio (MSR) node, a home base station, a network controller, an access node, a wireless node, an access point (AP), a transmission node, a transceiver node, a baseband unit (BBU), a remote radio unit (RRU), an active antenna unit (AAU), a remote radio head (RRH), a central unit (CU), a distributed unit (DU), or a positioning node. The base station may be a macro base station, a micro base station, a relay node, a donor node, or the like, or a combination thereof. The base station may further refer to a communications module, a modem, or a chip that is configured to be disposed in the foregoing device or apparatus. The base station may further be a mobile switching center and a device-to-device (D2D), a vehicle-to-everything (V2X), a device that functions as a base station in machine-to-machine (M2M) communication, a network side device in a 6G network, a device that functions as a base station in a future communications system, or the like. The base station may support a network of a same or different access technologies. A specific technology and a specific device form used by the network device are not limited in the embodiments of this present disclosure.

The base station may be stationary or mobile. For example, a helicopter or drone may be configured to act as a mobile base station, and one or more cells may be moved according to the location of the mobile base station. In other examples, a helicopter or drone may be configured as a device for communicating with another base station.

In some deployments, the network device in the embodiments of this present disclosure may refer to the CU or DU, or the network device includes a CU and a DU. The gNB may further include an AAU.

The network device and the terminal device may be deployed on land indoors or outdoors, and the network device and the terminal device each may be a handheld or in-vehicle device. The network device and the terminal device may also be deployed on a water surface, on airborne aircraft, balloons and satellites. A scenario in which the network device and the terminal device are located is not limited in the embodiments of this present disclosure.

It should be understood that the communications device involved in this present disclosure may be a network device, or may be a terminal device. For example, the first communications device is a network device, and the second communications device is a terminal device. For another example, the first communications device is a terminal device, and the second communications device is a network device. For another example, both the first communications device and the second communications device are network devices, or both are terminal devices.

It should also be understood that all or a part of functions of the communications device in this present disclosure may be implemented by software running on hardware or by a virtualized function instantiated on a platform (for example, a cloud platform). In wireless communications, spectrum shifting may be completed in a signal modulation manner. For example, a signal generated by the terminal is a low-frequency signal, and the low-frequency signal is not suitable for transmission on a channel. After signal modulation, the low-frequency signal may be converted into a high-frequency signal suitable for transmission on a channel.

For a terminal device in a radio resource control (RRC) idle state, the terminal device may establish an RRC connection to the base station in an initial access manner. The initial access process may include cell search, uplink synchronization, and the like.

The cell search may be a process in which the terminal device implements downlink time-frequency synchronization with the base station and obtains an identity (ID). In a cell search process, the terminal device may detect a synchronization signal/physical broadcast channel (SSS/PBCH) (SSB for short). For uplink synchronization, the terminal device may obtain uplink synchronization with the base station in a random-access manner.

There are two types of random access: one is contention-based random access, and the other is non-contention-based random access. The following describes the two random access manners with reference to FIG. 2 and FIG. 3.

Figure 2:
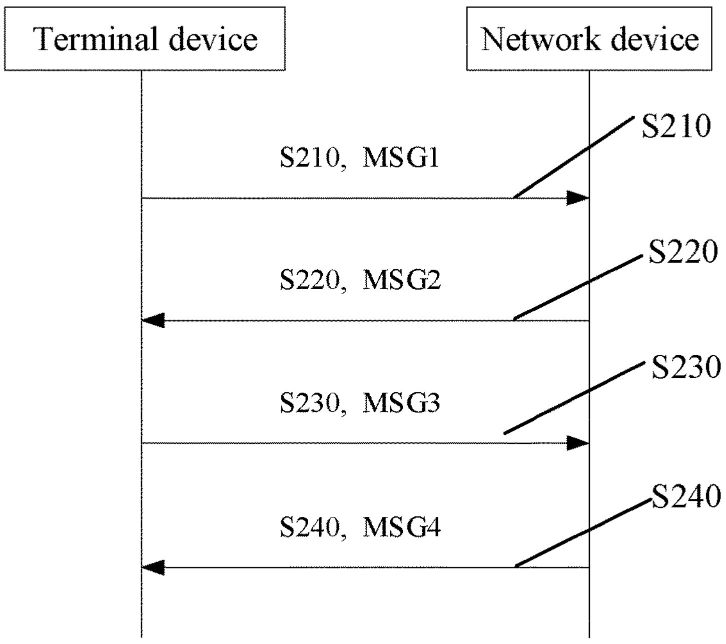
FIG. 2 is a schematic flowchart of contention-based random access.

FIG. 2 is a flowchart of contention-based random-access according to an embodiment of this present disclosure. The method includes step S210 to step S240.

In step S210, the terminal device sends a message 1 (MSG1) in a random-access process to the network device, where the message 1 includes a preamble.

The terminal device may select a random-access channel (RACH) resource and a preamble, and send the selected preamble on the selected resource. The RACH resource may also be referred to as a physical random-access channel (PRACH) resource.

The network device may send the configuration information of the PRACH to the terminal device in a broadcast form. The configuration information of the PRACH may include configuration information of a time-frequency resource of the PRACH and configuration information of a start preamble root sequence. A preamble or a preamble set corresponding to the network device can be determined based on configuration information of the PRACH.

The network device may configure a shared preamble pool for the terminal device. A preamble in the preamble pool is shared by multiple terminal devices. The terminal device may select a preamble based on a specific policy. Because the preamble is shared by multiple terminal devices, there is a case in which multiple terminal devices select a same preamble. The network device may use a subsequent resolution mechanism to resolve such conflict.

In step S220, the network device sends an MSG2 to the terminal device, and the MSG2 may also be referred to as a random-access response (RAR). The MSG2 may be carried by a physical downlink control channel (PDCCH).

After sending the MSG1, the terminal device may open a random-access response time window, and monitor, in the time window, a PDCCH scrambled by a random access-radio network temporary identifier (RA-RNTI). The RA-RNTI is related to a time-frequency resource of a RACH used by the terminal device to send the MSG1. After receiving the PDCCH, the terminal device may decode the PDCCH with the RA-RNTI.

The MSG2 may further include a preamble sent by the terminal device. If the terminal device receives a PDCCH scrambled with the RA-RNTI, and the MSG2 includes a preamble sent by the terminal device, the terminal device can determine that the random-access response is successfully received.

After successfully receives the PDCCH, the terminal device can obtain a physical downlink shared channel (PDSCH) scheduled by the PDCCH, where the PDSCH includes the RAR. The RAR may include multiple pieces of information. For example, a sub-header of the RAR may include a backoff indicator (BI), and the BI may be used to indicate a sub-header time of a retransmission MSG1. A random-access preamble identification (RAPID) in the RAR indicates a preamble index that the network device responds to. A payload in the RAR may include a timing advance group (TAG), and the TAG may be configured to adjust uplink timing. The RAR may further include an UL grant, configured to schedule an uplink resource indication of the MSG3. The RAR may further include a temporary cell radio network temporary identifier (C-RNTI). An initial accessed terminal device may use the temporary C-RNTI to decode a PDCCH of the MSG4.

A failure of the terminal device fails to receive the RAR in the random-access response time window or to verify the RAR indicates that the response fails. In this case, if the quantity of random-access attempts of the terminal device is less than the upper limit value (for example, 10 times), the terminal device may continue to attempt to perform random access. If the quantity of attempts is greater than the upper limit, random access fails.

In step S230, the terminal device sends the MSG3 to the network device. The terminal device may send the MSG3 on the uplink grant scheduled by the network device. The MSG3 may also be referred to as an RRC connection setup request message.

The MSG3 is mainly used to notify the network device of an event that triggers the random-access process. The MSG3 includes the C-RNTI of the terminal device. In different scenarios, the MSG3 sent by the terminal device is different. The following uses an example to describe some scenarios.

For example, in an RRC connection establishment scenario, the terminal device may send an RRC connection establishment request message through the MSG3, and the RRC connection establishment request message may carry a non-access stratum (NAS) UE_ID. The RRC connection setup request message may be transmitted through a common control channel (CCCH) in radio link control (RLC) layer transmitting (TM). The message is not segmented.

For another example, for an RRC connection reestablishment request, the terminal device may send an RRC reestablishment request message through the MSG3, where the RRC reestablishment request message does not carry the NAS message, and the RRC reestablishment request message may be transmitted by the TM using the CCCH at the RLC layer. The message is not segmented.

For another example, in a cell handover scenario, if the terminal device accesses the target cell and does not have a dedicated preamble in a handover process, contention-based random access may be triggered. The terminal device may send the RRC handover acknowledgement message and the C-RNTI through the MSG3. The RRC handover acknowledgement message and the C-RNTI may be transmitted through a dedicated control channel (DCCH). In some embodiments, the MSG3 may further carry a buffer status report (BSR).

In step S240, the network device sends an MSG4 to the terminal device.

The MSG4 has two functions. One is used to resolve contend conflict, and the other is to send an RRC configuration message to the terminal device. If the terminal device carries the C-RNTI in the MSG3, for example, an RRC reconstruction process, the MSG4 is scheduled through the PDCCH scrambled by the C-RNTI. Correspondingly, the terminal device may decode the PDCCH with the C-RNTI in the MSG3 to obtain the MSG4. If the terminal device does not carry the C-RNTI in the MSG3, for example, initial access, the MSG4 may be scheduled through a PDCCH scrambled by using the temporary C-RNTI. Correspondingly, the terminal device may decode the PDCCH with the temporary C-RNTI in the MSG2 to obtain the MSG4. After successfully decoding the PDCCH, the terminal device obtains the PDSCH that carries the MSG4. The terminal device may compare a common control channel (CCCH) serving data unit (SDU) in the PDSCH with a CCCH SDU in the MSG3. If the two are the same, it indicates that contention resolution succeeds. After the contention is resolved, the temporary C-RNTI is promoted to C-RNTI (where the temporary C-RNTI is promoted to C-RNTI for a UE which detects RA success and does not already have a C-RNTI; it is dropped by others).

For a random-access scenario such as switching and data transmission in an uplink/downlink out-of-synchronization state, in this case, the terminal device has allocated the C-RNTI. In the MAC CE in the MSG3, the terminal device may notify the network device of the C-RNTI. Therefore, the base station may schedule the MSG4 through the PDCCH scrambled by the C-RNTI, instead of the MSG4 scheduled by the temporary C-RNTI (where the C-RNTI on PDCCH for UE in RRC_CONNECTED). Success of the terminal device in decoding the PDCCH scheduling command indicates that contention resolution is completed, and specific content in the MSG4 is not related to contention resolution. In this case, the TC-RNTI allocated by the base station in the MSG2 fails. Subsequently, the base station continues to allocate the TC-RNTI to another UE for use (wherein a UE which detects RA success and already has a C-RNTI, resumes using its C-RNTI). Therefore, MSG4 does not include the UE contention resolution identifier in this case.

Figure 3:
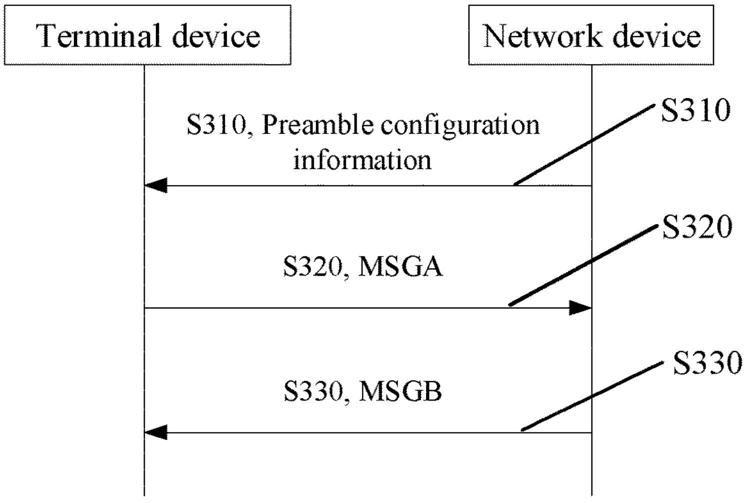
FIG. 3 is a schematic flowchart of non-contention based random access.

FIG. 3 is a flowchart of a non-contention-based random-access method according to an embodiment of this present disclosure. The method includes steps S310 to S330.

In step S310, the network device sends preamble configuration information to the terminal device, where the configuration information includes a preamble and a PRACH resource that are necessary in a random-access process. The preamble is a dedicated preamble allocated by the network device to the terminal device. The dedicated preamble may be notified to the terminal device via RRC signaling or physical (PHY) signaling (for example, DCI in a PDCCH). Using the dedicated preamble does not cause a problem of conflict with another terminal device.

In step S320, the terminal device may send the MSGA to the network device according to the preamble configuration information. That is, the terminal device may send the preamble to the network device on the RACH resource.

In step S330, the network device sends an MSGB to the terminal device, and the MSGB may include a RAR. Receipt of the RAR indicates that the random-access process ends.

In some present disclosure scenarios, for example, logistics monitoring, vehicle management, public safety, weather forecast, auxiliary navigation, and the like, the terminal device is to be positioned.

The positioning may include coarse positioning and fine positioning according to different positioning precision. The embodiments of this present disclosure mainly describe the coarse positioning, which may include cell-id-based positioning. The cell-id-based positioning may also be referred to as CID positioning. The implementation principle is as follows. The positioning platform sends signaling to the core network to query the ID of the cell in which the terminal device is located. Then, the positioning platform may determine an approximate location of the terminal device according to data in a stored base station almanac (BSA). The positioning accuracy of such positioning depends on the size of a base station or a cell, and is generally in the range of several hundred to several thousand meters. In terms of relatively high-precision positioning, coarse positioning service complexity is relatively low.

In addition, the cell-id-based positioning requires the terminal device to support the positioning operation. In a positioning process, the terminal device needs to enter a positioning operation procedure, and the positioning operation procedure necessitates an RRC connected state. The terminal device may receive a positioning service request, and report the positioning capability. The terminal device may perform positioning measurement in response to an instruction of the positioning server, and send a measurement result to the positioning server, so that the positioning server performs location estimation. The positioning process is relatively complex, and a delay is relatively high.

The positioning based on cell-id has a problem of low positioning accuracy. To improve positioning accuracy, a positioning technology that enhances a CID (enhanced CID, E-CID) appears. E-CID may refer to adding some other information (for example, angle-of-arrival (AOA) and timing advance (TA)) for auxiliary positioning based on cell-id, so as to improve the positioning accuracy. The E-CID positioning may include: Cell-id+AOA, cell-id+TA, cell-id+AOA+TA, and the like. The following describes the AOA-based positioning mode.

In some wireless communications systems (e.g., NR, LTE, etc.), AOA-based positioning may be supported. AOA may represent direction information of the base station relative to the terminal device. The positioning refers to determining a location of the terminal device based on an incident angle at which a signal of the terminal device is sent to the base station. The base station obtains the AOA information, the terminal device has a positioning function, and positioning-related operations and signaling are activated. In addition, the terminal device enters the RRC connected state and performs positioning according to a process similar to CID positioning, which increases complexity and delay of positioning.

It can be learned from the foregoing that the terminal device needs to enter the RRC connected state in order to obtain the AOA information. Only a terminal device in an RRC connected state or an RRC inactive state can obtain related configuration information (such as a sounding reference signal (SRS)) of a positioning pilot, so that the terminal device can be positioned.

It may be learned from the foregoing that, direction information (for example, AOA) of the base station relative to the terminal device may be further determined in order to improve positioning accuracy. However, currently a problem that a delay is relatively large, and a procedure is complex exists in determining the foregoing direction information, which is not conducive to reducing a positioning delay of the terminal device.

In view of this, an embodiment of this present disclosure provides a positioning method. In an initial access process, the terminal device obtains first information associated with direction information of the terminal device relative to a base station. That is, the terminal device obtains the first information before entering an RRC connected state or an RRC inactive state, so that a delay of obtaining the direction information by the terminal device can be reduced, and a positioning delay can be reduced.

Figure 4:
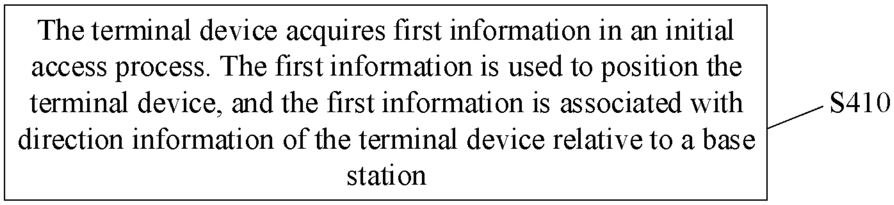
FIG. 4 is a schematic flowchart of a positioning method according to an embodiment of this present disclosure.
Figure 5:
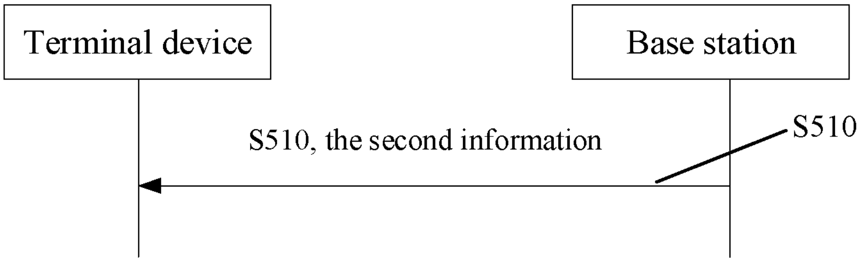
FIG. 5 is a schematic flowchart of the positioning method according to another embodiment of this present disclosure.

The following describes the solutions of the embodiments of this present disclosure in detail with reference to FIG. 4 and FIG. 5.

Referring to FIG. 4, in step S410, the terminal device acquires first information in an initial access process. The first information is used to position the terminal device, and the first information is associated with direction information of the terminal device relative to a base station.

Referring to FIG. 5, in step S510, the base station sends the second information in the initial access process to the terminal device. The second information is used to determine first information, and the first information is used to locate the terminal device. The first information is associated with direction information of the terminal device relative to the base station. The first information is determined based on the second information. In some embodiments, the second information is the same as the first information. In other embodiments, the second information and the first information may be different.

The following manners are also applicable to FIG. 4 and FIG. 5.

The base station in the embodiments of this present disclosure may be a base station corresponding to a cell selected by the terminal device in the initial access process. The terminal device in the embodiments of this present disclosure may be a terminal device in an RRC idle state, or the terminal device may be a terminal device that performs initial access.

Content of the first information is not specifically limited in the embodiments of this present disclosure. As an example, the first information may include direction information of the terminal device relative to the base station. In another example, the first information may also include direction information of the base station relative to the terminal device.

In some embodiments, the direction information of the terminal device relative to the base station is related to the direction information of the base station relative to the terminal device. If one piece of direction information is known, the other piece of direction information may be calculated. For example, if the direction information of the terminal device relative to the base station is known, the direction information of the base station relative to the terminal device can be determined. For another example, if direction information of the base station relative to the terminal device is known, direction information of the terminal device relative to the base station can be determined. In some embodiments, when the system is a frequency division duplex (FDD) system, it may be considered that the system has uplink-downlink reciprocity. For uplink-downlink direction information, if one piece of direction information is known, the other piece of direction information can be calculated.

The direction information of the terminal device relative to the base station may be obtained by the base station sending a signal to the terminal device, and the terminal device determines the direction information of the signal. The direction information of the base station relative to the terminal device may be obtained by the terminal device sending a signal to the base station, and the base station determines the direction information of the signal.

In some embodiments, the direction information of the base station relative to the terminal device may be, for example, AOA information. The terminal device may send a signal to the base station, and the base station may measure the signal to obtain the AOA information. In some embodiments, the second information may include the AOA information. The base station may send AOA information to the terminal device. That is, the base station may send the AOA information to the terminal device after obtaining it by performing measurement for the signal sent by the terminal device.

In some embodiments, the terminal device may send first indication information to the base station, where the first indication information is used to instruct the base station to perform AOA measurement, or the first indication information is used to instruct the base station to perform AOA feedback. The following describes the solution in the embodiments of this present disclosure by an example in which the first indication information is used to instruct the base station to perform AOA measurement.

The first indication information may be carried in a message in the random-access process. During the random-access process, the terminal device instructs the base station to perform AOA measurement, which helps the terminal device obtain AOA information in the random-access process, thereby reducing a positioning delay.

A manner in which the base station performs the AOA measurement is not specifically limited in the embodiments of this present disclosure. For example, the base station may perform AOA measurement based on a signal that carries the first indication information. For another example, the base station may also perform AOA measurement based on another signal (for example, signal not carrying the first indication information).

The random access in the embodiments of this present disclosure may be contention-based random access (also referred to as four-step random access), or may be non-contention-based random access (also referred to as two-step random access).

An indication manner of the first indication information is not specifically limited in the embodiments of this present disclosure. In an example, contention-based random access is used as an example, the first indication information may be carried by an MSG1 in the random-access process, or the first indication information may be carried by an MSG3 in the random-access process. In another example, non-contention-based random access is used as an example, and first indication information may be carried by an MSGA in the random-access process.

In some embodiments, the first indication information may be associated with a preamble. That is, the first indication information may be indicated by information associated with the preamble. The preamble may be a preamble in MSG1, or a preamble in MSGA. The preamble is reused to indicate the first indication information, which can save signaling overheads and help reduce positioning complexity.

In some embodiments, the first indication information may be associated with one or more of the following pieces of information: an index of a preamble, scrambling information of the preamble, or a preamble sequence. In some embodiments, the index of the preamble may also be referred to as a sequence number of the preamble.

In some embodiments, the first indication information may be associated with the index of the preamble, that is, the terminal device may indicate the first indication information by the index of the preamble. For example, the first indication information may be indicated by a specific preamble index. If the terminal device requests the base station to perform AOA measurement, the terminal device may send, to the base station, a preamble whose index is the specific index.

After receiving the preamble sent by the terminal device, the base station may determine, according to the preamble index, whether to perform AOA measurement. If the index of the preamble is a specific index, the base station performs AOA measurement. If the index of the preamble is not a specific index, the base station may not perform the AOA measurement.

The following describes the solutions in the embodiments of this present disclosure by an example in which the first index indicates to perform AOA measurement, and the second index indicates to not perform AOA measurement.

A value of the first index is not specifically limited in the embodiments of this present disclosure. For example, the value of the first index may be an even number. For another example, a value of the first index may be an odd number. For another example, the value of the first index may be a value in a range. For example, the value of the first index may be greater than or equal to a first value, and/or the value of the first index may be less than or equal to a second value.

A numbering manner of the preamble index is not specifically limited in the embodiments of this present disclosure. In an example, preamble codes in the preamble set may be numbered in sequence, and indexes of different preamble codes are different. In another example, a preamble in a preamble set may be divided into multiple groups, and preambles in each group is independently numbered. For example, a preamble may be grouped according to a correspondence between an SSB and a preamble, a preamble corresponding to one SSB is a preamble group, and a preamble in each preamble group may be independently numbered.

For example, in an initial access-process, the terminal device may read a higher-layer parameter to obtain a mapping relationship between the SSB and the RO, so as to obtain two parameters N and R. N represents a quantity of SSBs associated with a RACH occasion (RO), and R represents a quantity of preambles corresponding to an SSB. If N is greater than or equal to 1, for the nth SSB, an index of a preamble of the nth SSB starts from $n*N_{total}/N$, where $N_{total}$ represents a total quantity of preambles used for random access. In the embodiments of this present disclosure, R preambles corresponding to one SSB may be numbered. It is assumed that a sequence number of the first preamble is 0, and subsequent preambles may be sequentially numbered.

In some embodiments, the first indication information may be associated with scrambling information of the preamble, that is, the terminal device may indicate the first indication information by the scrambling information of the preamble. As an example, the terminal device may indicate the first indication information by scrambling the preamble. If the terminal device needs to perform AOA measurement on the base station, the terminal device may scramble the preamble, that is, the terminal device sends the scrambled preamble to the base station. If the terminal device does not need to perform AOA measurement on the serving cell, the terminal device may not scramble the preamble, that is, the terminal device sends an unscrambled preamble to the base station.

After receiving the preamble, the base station may determine, according to whether the preamble is scrambled, whether to perform AOA measurement. If the received preamble is scrambled, the base station may determine that AOA measurement needs to be performed. If the received preamble is not scrambled, the base station may determine that AOA measurement does not need to be performed.

In another example, the terminal device may indicate the first indication information by specific scrambling information. If the terminal device requests the base station to perform AOA measurement, the terminal device may scramble the preamble by a specific scrambling code. If the terminal device does not request the base station to perform AOA measurement, the terminal device may scramble the preamble by another scrambling code.

After receiving the preamble, the base station may determine, according to scrambling code information of the preamble, whether to perform AOA measurement. If the received preamble is scrambled by a specific scrambling code, the base station determines that AOA measurement needs to be performed. If the received preamble is scrambled by a specific scrambling code, the base station determines that AOA measurement does not need to be performed.

The following describes the solutions in the embodiments of this present disclosure by an example in which the first scrambling code indicates to perform AOA measurement, and the second scrambling code indicates to not perform AOA measurement.

In some embodiments, the first scrambling code may be a Walsh code, and the second scrambling code may be an all-1 sequence. If the scrambling code of the preamble is Walsh code, the base station of the serving cell needs to perform AOA measurement. If the first scrambling code is an all-1 sequence, the base station of the serving cell does not need to perform AOA measurement. In other embodiments, the first scrambling code may be an all-1 sequence, and the second scrambling code may be a Walsh code. If the scrambling code of the preamble is an all-1 sequence, the base station of the serving cell needs to perform AOA measurement. If the scrambling code of the preamble is a Walsh code, the base station of the serving cell does not need to perform AOA measurement.

In some embodiments, the first indication information may be associated with a preamble sequence. That is, the terminal device may indicate the first indication information by the preamble sequence. For example, the terminal device may indicate the first indication information by a specific preamble sequence. If the terminal device needs the base station to perform AOA measurement, the terminal device may send a specific preamble sequence to the base station.

The specific preamble sequence may be a newly introduced preamble sequence or a dedicated preamble sequence. For example, some preamble sequences may be newly added to the original preamble set, and the preamble sequences may be used to instruct the base station to perform AOA measurement. If the base station needs to perform AOA measurement, the terminal device may send a dedicated preamble sequence to the base station. If the base station of the serving cell does not need to perform AOA measurement, the terminal device may send another preamble sequence to the base station.

After receiving the preamble, the base station may determine, according to whether the preamble is a dedicated preamble sequence, whether to perform AOA measurement. If the received preamble is a dedicated preamble sequence, the base station determines that AOA measurement needs to be performed. If the received preamble is not a dedicated preamble sequence, the base station determines that AOA measurement does not need to be performed.

In some embodiments, the foregoing dedicated preamble sequence may be a Zadoff-Chu sequence.

In some embodiments, the base station may also send the AOA information to the terminal device by using a message in a random-access process, so that the terminal device may obtain the AOA information through random access. For example, the base station may send AOA information to the terminal device, where the AOA information is carried in a random-access response message. The random-access response message carries the AOA information, so that the terminal device can obtain the AOA information as soon as possible, thereby reducing a positioning delay.

In some embodiments, as described above, the first information may include direction information of the terminal device relative to the base station. A manner of determining the first information is not specifically limited in the embodiments of this present disclosure. For example, the first information may be determined based on a correspondence between an SSB index and an SSB beam direction. In some embodiments, the second information may include a correspondence between the SSB index and the SSB beam direction, that is, the base station may send the correspondence between the SSB index and the SSB beam direction to the terminal device.

In some embodiments, before performing random access, the terminal device detects an SSB, and detects index information of the SSB. The SSB index determines the SSB sending direction. After detecting the index information of the SSB, the terminal device may determine the direction of the SSB beam according to the detected SSB index information and the correspondence between the SSB index and the SSB beam direction. Further, the terminal device may determine the direction information of the terminal device relative to the base station based on the direction of the SSB beam.

In some embodiments, the correspondence between the SSB index and the SSB beam direction may be sent by the base station to the terminal device. For example, the base station may send the correspondence between the SSB index and the SSB beam direction to the terminal device by a broadcast message. That is, the correspondence between the SSB index and the SSB beam direction is carried in the broadcast message.

In some embodiments, the terminal device may receive an SSB sent by the base station, and determine an angle of the terminal device relative to the base station according to index information of the SSB and a correspondence between the index of the SSB and the SSB beam direction. Further, the terminal device may determine location information of the terminal device based on the angle. For example, the terminal device may determine the location information of the terminal device based on the angle and the location information of the base station.

The foregoing described base station may be one base station, or may be multiple base stations. For example, the base station may be a base station of a serving cell, or may be a base station of a neighboring cell. For another example, the base station may include a base station of a serving cell and a base station of a neighboring cell.

If the base station includes a base station of a serving cell and a base station of a neighboring cell, the first information may be determined based on a first correspondence and a second correspondence. The first correspondence may include a correspondence between the SSB index of the serving cell and the SSB beam direction, and the second correspondence may include a correspondence between the SSB index of the neighboring cell and the SSB beam direction. The first correspondence may be sent by a base station of a serving cell, and the second correspondence may be sent by a base station of a neighboring cell.

The terminal device may find SSB information of multiple cells while searches for a downlink synchronization signal. That is, the SSB information found by the terminal device includes not only the SSB information of the serving cell, but also the SSB information of the neighboring cell. In some embodiments, the terminal device may separately determine a direction of the terminal device relative to the serving cell and the neighboring cell according to the correspondence between the SSB index of the serving cell and the beam direction of the SSB, and the correspondence between the SSB index of the neighboring cell and the beam direction of the SSB.

In some embodiments, the terminal device may detect the SSB information of the multiple cells. Using the serving cell and the neighboring cell as an example, the terminal device may receive the first SSB sent by the base station of the serving cell, and determine a first angle of the terminal device relative to the base station of the serving cell based on the index of the first SSB and the first correspondence. The terminal device may receive the second SSB sent by the base station of the neighboring cell, and determine a second angle of the terminal device relative to the base station of the neighboring cell based on the index of the second SSB and the second correspondence. The terminal device may determine the location information of the terminal device based on the first angle, the second angle, the location information of the base station of the serving cell, and the location information of the base station of the neighboring cell.

The foregoing describes a solution for determining location information by the terminal device. Certainly, the location information of the terminal device may also be determined by the base station or the positioning device. The terminal device may send the detected SSB information to the base station or the positioning device, and then the base station or the positioning device determines the location of the terminal device based on the SSB information.

A manner in which the base station or the positioning device determines the location of the terminal device is similar to a manner in which the terminal device determines the location. For content not described in detail, reference can be made to the foregoing description.

In an example, the terminal device may send the detected SSB index information to the base station, and the base station may determine an angle of the terminal device relative to the base station based on the SSB index and a correspondence between the SSB index and the SSB beam direction. Further, the base station may determine the location information of the terminal device based on the angle. For example, the base station may determine the location information of the terminal device based on the angle and the location information of the base station.

The foregoing SSB index may include an index of the first SSB and an index of the second SSB. The base station (for example, the base station of the serving cell) may determine a first angle based on the index of the first SSB and a first correspondence. The base station may determine the second angle based on the index of the second SSB and the second correspondence. The base station may determine the location information of the terminal device based on the first angle, the second angle, the location information of the base station of the serving cell, and the location information of the neighboring cell.

For example, the base station may receive an index of the first SSB sent by the terminal device, and determine a first angle of the terminal device relative to the base station of the serving cell based on the index of the first SSB and the first correspondence. The base station may receive the index of the second SSB sent by the terminal device, and determine a second angle of the terminal device relative to the base station of the neighboring cell based on the index of the second SSB and the second correspondence. The base station may determine the location information of the terminal device based on the first angle, the second angle, the location information of the base station of the serving cell, and the location information of the base station of the neighboring cell.

In another example, the terminal device may send the detected SSB index information to the positioning device, and the positioning device may determine an angle of the terminal device relative to the base station based on the SSB index and a correspondence between the SSB index and the SSB beam direction. Further, the positioning device may determine the location information of the terminal device based on the angle. For example, the positioning device may determine the location information of the terminal device based on the angle and the location information of the base station.

The foregoing SSB index may include an index of the first SSB and an index of the second SSB. The positioning device may determine a first angle based on the index of the first SSB and the first correspondence. The positioning device may determine the second angle based on the index of the second SSB and the second correspondence. The positioning device may determine the location information of the terminal device based on the first angle, the second angle, the location information of the base station of the serving cell, and the location information of the base station of the neighboring cell.

For example, the positioning device may receive an index of the first SSB sent by the terminal device, and determine a first angle of the terminal device relative to the base station of the serving cell based on the index of the first SSB and the first correspondence. The positioning device may receive an index of the second SSB sent by the terminal device, and determine a second angle of the terminal device relative to a base station of a neighboring cell based on the index of the second SSB and the second correspondence. The positioning device may determine the location information of the terminal device based on the first angle, the second angle, the location information of the base station of the serving cell, and the location information of the base station of the neighboring cell.

The following provides an example for describing a solution of determining the location information of the terminal device based on the first angle, the second angle, the location information of the base station of the serving cell, and the location information of the base station of the neighboring cell.

It is assumed that a first angle is $\theta_1$, a second angle is $\theta_2$, the location of the base station of the serving cell is ($x_{b1}$, $y_{b1}$), the location of the base station of the neighboring cell is ($x_{b2}$, $y_{b2}$), a location of a terminal device is (x, y), and the location of the terminal device may be expressed as follows.

$$\begin{cases} x = \dfrac{y_{b1} - y_{b2} + ctg(\theta_2)x_{b2} - ctg(\theta_1)x_{b1}}{ctg(\theta_2) - ctg(\theta_1)} \\ y = \dfrac{x_{b1} - x_{b2} + tg(\theta_2)y_{b2} - tg(\theta_1)y_{b1}}{tg(\theta_2) - tg(\theta_1)} \end{cases}$$

The foregoing x-axis is perpendicular to the y axis. $\theta_1$ and $\theta_2$ may be angles in an xy coordinate system. For example, the y-axis is in a positive north direction, the x axis is in a positive east direction, and $\theta_1$ and $\theta_2$ may be angles in a relative positive north direction.

The neighboring cell may include multiple cells. For example, the neighboring cell includes a first neighboring cell and a second neighboring cell, and a location of the terminal device may be determined based on angles of the terminal device relative to multiple neighboring cells. Positioning the terminal device by combining multiple cells can improve positioning accuracy of the terminal device.

The location coordinates of the terminal device may be expressed as follows.

$$\begin{cases} x = \alpha\dfrac{y_{b1} - y_{b2} + ctg(\theta_2)x_{b2} - ctg(\theta_1)x_{b1}}{ctg(\theta_2) - ctg(\theta_1)} + (1-\alpha)\dfrac{y_{b1} - y_{b3} + ctg(\theta_3)x_{b3} - ctg(\theta_1)x_{b1}}{ctg(\theta_3) - ctg(\theta_1)} \\ y = \alpha\dfrac{x_{b1} - x_{b2} + tg(\theta_2)y_{b2} - tg(\theta_1)y_{b1}}{tg(\theta_2) - tg(\theta_1)} + (1-\alpha)\dfrac{x_{b1} - x_{b3} + tg(\theta_3)y_{b3} - tg(\theta_1)y_{b1}}{tg(\theta_3) - tg(\theta_1)} \end{cases}$$

The x-axis is perpendicular to the y-axis, $(x_{b1}, y_{b1})$ is location coordinates of the base station of the serving cell, $(x_{b2}, y_{b2})$ is location coordinates of a base station of the first neighboring cell, $(x_{b3}, y_{b3})$ is location coordinates of a base station of the second neighboring cell, $\theta_1$ is the first angle, $\theta_2$ is an angle of the terminal device relative to the first neighboring cell, $\theta_3$ is an angle of the terminal device relative to the second neighboring cell, and $\alpha$ represents a weight coefficient.

$\alpha$ may be determined based on a signal measurement result of the terminal device for the neighboring cell. For example, $\alpha$ may be determined based on a signal measurement result of the terminal device for the first neighboring cell and a signal measurement result of the terminal device for the second neighboring cell.

The following uses an example in which a signal measurement result is reference signal receiving power (RSRP). $\alpha$ may be determined from the following formula.

$$\alpha = \frac{RSRP_1}{RSRP_1 + RSRP_2}$$

$RSRP_1$ represents a RSRP value of measurement performed by the terminal device on the base station of the first neighboring cell, and $RSRP_2$ represents a RSRP value of measurement performed by the terminal device on the base station of the second neighboring cell.

It should be understood that the RSRP in the foregoing formula may also be replaced with another value in a signal measurement result, for example, reference signal receiving quality (RSRQ).

It should be noted that, the foregoing uses an angle of the terminal device relative to the base station as an example to describe a calculation formula of location coordinates of the terminal device. It can be understood that the foregoing formula is also applicable to an angle of the base station relative to the terminal device. The angle of the terminal device relative to the base station is reciprocal to the angle of the base station relative to the terminal device. Therefore, the location coordinates of the terminal device may also be determined based on the angle of the base station relative to the terminal device.

For example, the location information of the terminal device may be determined based on an angle of the base station of the serving cell relative to the terminal device, an angle of the base station of the neighboring cell relative to the terminal device, location information of the base station of the serving cell, and location information of the base station of the neighboring cell. For a specific determining manner, reference can be made to the foregoing description. For brevity, details are not described herein again. The foregoing neighboring cell may include multiple cells, for example, the neighboring cell may include a first neighboring cell and a second neighboring cell. The foregoing location information of the base station relative to the terminal device may be obtained from measurement by the base station.

The solution in the embodiments of this present disclosure may be used in combination with another positioning manner. For example, the direction information determined in the embodiments of this present disclosure may be combined with cell id to jointly locate the terminal device. For another example, the direction information determined in the embodiments of this present disclosure may be combined with the TA to jointly locate the terminal device. For another example, the direction information determined in the embodiments of this present disclosure may be combined with cell id and TA to jointly locate the terminal device.

In some embodiments, the positioning manner in this embodiment of this present disclosure may be combined with another precise positioning manner to implement precise positioning of the terminal device. In this embodiment of this present disclosure, a delay of acquiring direction information can be reduced. Therefore, precise positioning is performed based on the positioning, and complexity of acquiring precise positioning information can be reduced.

The foregoing describes the method embodiments of this present disclosure in detail with reference to FIG. 1 to FIG. 5. The following describes the device embodiments of this present disclosure in detail with reference to FIG. 6 to FIG. 9. It should be understood that the description of the method embodiment corresponds to the description of the device embodiment. Therefore, for a part that is not described in detail, reference can be made to the foregoing method embodiment.

Figure 6:
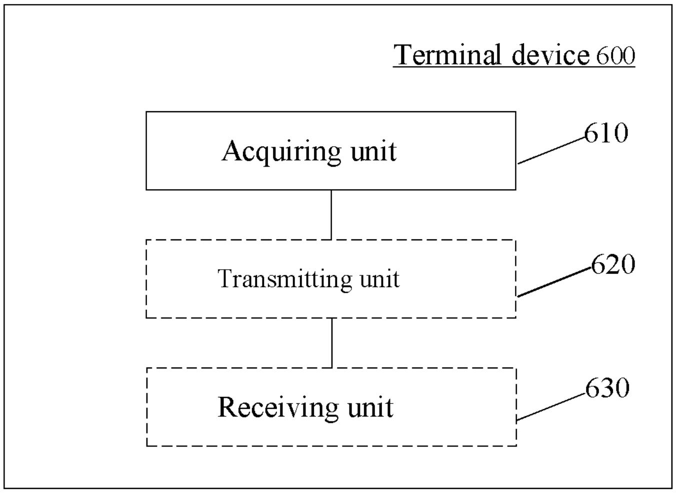
FIG. 6 is a schematic block diagram of a terminal device according to an embodiment of this present disclosure.

FIG. 6 is a schematic block diagram of a terminal device according to an embodiment of this present disclosure. The terminal device 600 shown in FIG. 6 may be any terminal device described above. The terminal device 600 may include an acquiring unit 610.

The acquiring unit 610 is configured to acquire first information in an initial access process. The first information is used to locate the terminal device, and the first information is associated with direction information of the terminal device relative to a base station.

In some embodiments, the first information includes angle of arrival AOA information, and the terminal device further includes a sending unit 610, configured to send first indication information to the base station. The first indication information is used to instruct the base station to perform AOA measurement, and the first indication information is carried in a message in the random-access process.

In some embodiments, the first indication information is associated with a preamble in the random-access process.

In some embodiments, the first indication information is associated with one or more of the following pieces of information: an index of a preamble, scrambling information of a preamble sequence, or a preamble sequence.

In some embodiments, the terminal device further includes a receiving unit 630, configured to receive AOA information sent by the base station. The AOA information is carried in a random-access process message.

In some embodiments, the AOA information is carried in a message of the random-access response.

In some embodiments, the first information includes direction information of the terminal device relative to the base station, and the first information is determined based on a correspondence between an SSB index and an SSB beam sending direction.

In some embodiments, the correspondence between the SSB index and the SSB beam sending direction is carried in a broadcast message.

In some embodiments, the base station includes a base station of a serving cell and a base station of a neighboring cell. The first information is determined based on a first correspondence and a second correspondence. The first correspondence includes a correspondence between an SSB index of a serving cell and an SSB beam direction. The second correspondence includes a correspondence between an SSB index of a neighboring cell and the SSB beam direction.

In some embodiments, the terminal device further includes a sending unit 620 and a receiving unit 630. The receiving unit 630 is configured to receive a first SSB sent by a base station of the serving cell. The terminal device further includes a determining unit configured to determine a first angle of the terminal device relative to the base station of the serving cell based on the index of the first SSB and the first correspondence. The receiving unit 630 is configured for the terminal device to receive a second SSB sent by the base station of the neighboring cell. The determining unit is configured to determine a second angle of the terminal device relative to the base station of the neighboring cell based on the index of the second SSB and the second correspondence. The determining unit is configured to determine location information of the terminal device based on the first angle, the second angle, the location information of the base station of the serving cell, and the location information of the base station of the neighboring cell.

In some embodiments, the location coordinates (x, y) of the terminal device are as follows.

$$\begin{cases} x = \dfrac{y_{b1} - y_{b2} + ctg(\theta_2)x_{b2} - ctg(\theta_1)x_{b1}}{ctg(\theta_2) - ctg(\theta_1)} \\ y = \dfrac{x_{b1} - x_{b2} + tg(\theta_2)y_{b2} - tg(\theta_1)y_{b1}}{tg(\theta_2) - tg(\theta_1)} \end{cases}$$

The x-axis is perpendicular to the y-axis, $(x_{b1}, y_{b1})$ is location coordinates of the base station of the serving cell, $(x_{b2}, y_{b2})$ is location coordinates of the base station of the neighboring cell, $\theta_1$ is the first angle, and $\theta_2$ is the second angle.

In some embodiments, the neighboring cell includes a first neighboring cell and a second neighboring cell. The location coordinates (x, y) of the terminal device may be expressed as follows.

$$\begin{cases} x = \alpha\dfrac{y_{b1} - y_{b2} + ctg(\theta_2)x_{b2} - ctg(\theta_1)x_{b1}}{ctg(\theta_2) - ctg(\theta_1)} + (1-\alpha)\dfrac{y_{b1} - y_{b3} + ctg(\theta_3)x_{b3} - ctg(\theta_1)x_{b1}}{ctg(\theta_3) - ctg(\theta_1)} \\ y = \alpha\dfrac{x_{b1} - x_{b2} + tg(\theta_2)y_{b2} - tg(\theta_1)y_{b1}}{tg(\theta_2) - tg(\theta_1)} + (1-\alpha)\dfrac{x_{b1} - x_{b3} + tg(\theta_3)y_{b3} - tg(\theta_1)y_{b1}}{tg(\theta_3) - tg(\theta_1)} \end{cases}$$

The x-axis is perpendicular to the y-axis, $(x_{b1}, y_{b1})$ is location coordinates of the base station of the serving cell, $(x_{b2}, y_{b2})$ is location coordinates of a base station of the first neighboring cell, $(x_{b3}, y_{b3})$ is location coordinates of a base station of the second neighboring cell, $\theta_1$ is the first angle, $\theta_2$ is an angle of the terminal device relative to the first neighboring cell, $\theta_3$ is an angle of the terminal device relative to the second neighboring cell, and $\alpha$ represents a weight coefficient.

In some embodiments, $\alpha$ is determined from the following formula.

$$\alpha = \frac{RSRP_1}{RSRP_1 + RSRP_2}$$

$RSRP_1$ represents a RSRP value of measurement performed by the terminal device on the base station of the first neighboring cell, and $RSRP_2$ represents a RSRP value of measurement performed by the terminal device on the base station of the second neighboring cell.

Figure 7:
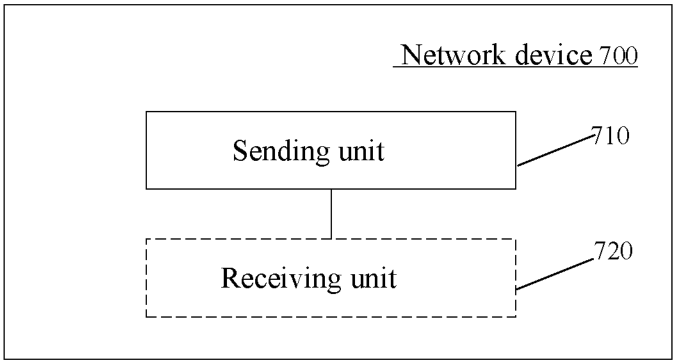
FIG. 7 is a schematic block diagram of a network device according to an embodiment of this present disclosure.

FIG. 7 is a schematic block diagram of a network device according to an embodiment of this present disclosure. The network device 700 shown in FIG. 7 may be any network device described above. The network device 700 may include a sending unit 710.

The sending unit 710 is configured to send second information in an initial access process to a terminal device. The second information is used to determine first information, the first information is used to locate the terminal device, and the first information is associated with direction information of the terminal device relative to the base station.

In some embodiments, the first information includes angle of arrival AOA information, and the network device further includes a receiving unit 720 configured to receive first indication information sent by the terminal device. The first indication information is used to instruct the base station to perform AOA measurement, and the first indication information is carried in a message in the random-access process.

In some embodiments, the first indication information is associated with a preamble in the random-access process.

In some embodiments, the first indication information is associated with one or more of the following pieces of information: an index of a preamble, scrambling information of a preamble sequence, or a preamble sequence.

In some embodiments, the second information includes AOA information, and the AOA information is carried in a message of the random-access process.

In some embodiments, the AOA information is carried in a random-access response message.

In some embodiments, the first information includes direction information of the terminal device relative to the base station, and the second information includes a correspondence between an SSB index and an SSB beam direction.

In some embodiments, the correspondence between the SSB index and the SSB beam direction is carried in a broadcast message.

In some embodiments, the base station includes a base station of a serving cell and a base station of a neighboring cell. The first information is determined based on a first correspondence and a second correspondence. The first correspondence includes a correspondence between an SSB index of a serving cell and an SSB beam direction. The second correspondence includes a correspondence between an SSB index of a neighboring cell and the SSB beam direction.

In some embodiments, the network device further includes a receiving unit 720 configured to receive an index of a first SSB sent by the terminal device, where the index of the first SSB is an SSB index that is obtained by the terminal device by performing measurement for the serving cell; and a determining unit configured to determine a first angle of the terminal device relative to the base station of the serving cell based on the index of the first SSB and the first correspondence. The receiving unit 720 is configured to receive an index of a second SSB sent by the terminal device, where the index of the second SSB is an SSB index obtained by the terminal device performing measurement for the neighboring cell. The determining unit is configured to determine a second angle of the terminal device relative to a base station of the neighboring cell based on the index of the second SSB and the second correspondence. The determining unit is configured to determine location information of the terminal device based on the first angle, the second angle, the location information of the base station of the serving cell, and the location information of the base station of the neighboring cell.

In some embodiments, the location coordinates (x, y) of the terminal device are as follows.

$$\begin{cases} x = \dfrac{y_{b1} - y_{b2} + ctg(\theta_2)x_{b2} - ctg(\theta_1)x_{b1}}{ctg(\theta_2) - ctg(\theta_1)} \\ y = \dfrac{x_{b1} - x_{b2} + tg(\theta_2)y_{b2} - tg(\theta_1)y_{b1}}{tg(\theta_2) - tg(\theta_1)} \end{cases}$$

The x-axis is perpendicular to the y-axis, $(x_{b1}, y_{b1})$ is location coordinates of the base station of the serving cell, $(x_{b2}, y_{b2})$ is location coordinates of the base station of the neighboring cell, $\theta_1$ is the first angle, and $\theta_2$ is the second angle.

In some embodiments, the neighboring cell includes a first neighboring cell and a second neighboring cell. The location coordinates (x, y) of the terminal device may be expressed as follows.

$$\begin{cases} x = \alpha\dfrac{y_{b1} - y_{b2} + ctg(\theta_2)x_{b2} - ctg(\theta_1)x_{b1}}{ctg(\theta_2) - ctg(\theta_1)} + (1-\alpha)\dfrac{y_{b1} - y_{b3} + ctg(\theta_3)x_{b3} - ctg(\theta_1)x_{b1}}{ctg(\theta_3) - ctg(\theta_1)} \\ y = \alpha\dfrac{x_{b1} - x_{b2} + tg(\theta_2)y_{b2} - tg(\theta_1)y_{b1}}{tg(\theta_2) - tg(\theta_1)} + (1-\alpha)\dfrac{x_{b1} - x_{b3} + tg(\theta_3)y_{b3} - tg(\theta_1)y_{b1}}{tg(\theta_3) - tg(\theta_1)} \end{cases}$$

The x-axis is perpendicular to the y-axis, $(x_{b1}, y_{b1})$ is location coordinates of the base station of the serving cell, $(x_{b2}, y_{b2})$ is location coordinates of a base station of the first neighboring cell, $(x_{b3}, y_{b3})$ is location coordinates of a base station of the second neighboring cell, $\theta_1$ is the first angle, $\theta_2$ is an angle of the terminal device relative to the first neighboring cell, $\theta_3$ is an angle of the terminal device relative to the second neighboring cell, and $\alpha$ represents a weight coefficient.

In some embodiments, $\alpha$ is determined from the following formula.

$$\alpha = \frac{RSRP_1}{RSRP_1 + RSRP_2}$$

$RSRP_1$ represents a RSRP value of measurement performed by the terminal device on the base station of the first neighboring cell, and $RSRP_2$ represents a RSRP value of measurement performed by the terminal device on the base station of the second neighboring cell.

Figure 8:
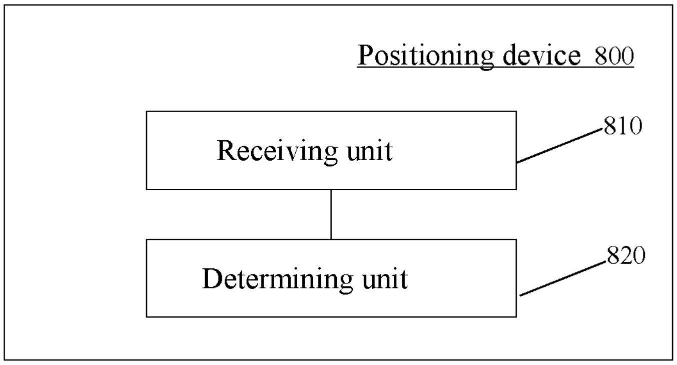
FIG. 8 is a schematic block diagram of a positioning device according to an embodiment of this present disclosure.

FIG. 8 is a schematic block diagram of a positioning device according to an embodiment of this present disclosure. The positioning device 800 shown in FIG. 8 may be any positioning device described above. The positioning device 800 may include a receiving unit 810 and a determining unit 820.

The receiving unit 810 is configured to receive an index of a first SSB sent by a terminal device, where the index of the first SSB is an SSB index obtained by the terminal device performing measurement for a serving cell.

The determining unit 820 is configured to determine a first angle of the terminal device relative to a base station of the serving cell based on the index of the first SSB and a first correspondence, where the first correspondence includes a correspondence between an SSB index of the serving cell and an SSB beam direction.

The receiving unit 810 is configured to receive an index of a second SSB sent by the terminal device, where the index of the second SSB is an SSB index obtained by the terminal device performing measurement for a neighboring cell.

The determining unit 820 is configured to determine a second angle of the terminal device relative to a base station of the neighboring cell based on the index of the second SSB and a second correspondence, where the second correspondence includes a correspondence between an SSB index of the neighboring cell and an SSB beam direction.

The determining unit 820 is configured to determine location information of the terminal device based on the first angle, the second angle, the location information of the base station of the serving cell, and the location information of the base station of the neighboring cell.

In some embodiments, the location coordinates (x, y) of the terminal device are as follows.

$$\begin{cases} x = \dfrac{y_{b1} - y_{b2} + ctg(\theta_2)x_{b2} - ctg(\theta_1)x_{b1}}{ctg(\theta_2) - ctg(\theta_1)} \\ y = \dfrac{x_{b1} - x_{b2} + tg(\theta_2)y_{b2} - tg(\theta_1)y_{b1}}{tg(\theta_2) - tg(\theta_1)} \end{cases}$$

The x-axis is perpendicular to the y-axis, $(x_{b1}, y_{b1})$ is location coordinates of the base station of the serving cell, $(x_{b2}, y_{b2})$ is location coordinates of the base station of the neighboring cell, $\theta_1$ is the first angle, and $\theta_2$ is the second angle.

In some embodiments, the neighboring cell includes a first neighboring cell and a second neighboring cell. The location coordinates (x, y) of the terminal device may be expressed as follows.

$$\begin{cases} x = \alpha\dfrac{y_{b1} - y_{b2} + ctg(\theta_2)x_{b2} - ctg(\theta_1)x_{b1}}{ctg(\theta_2) - ctg(\theta_1)} + (1-\alpha)\dfrac{y_{b1} - y_{b3} + ctg(\theta_3)x_{b3} - ctg(\theta_1)x_{b1}}{ctg(\theta_3) - ctg(\theta_1)} \\ y = \alpha\dfrac{x_{b1} - x_{b2} + tg(\theta_2)y_{b2} - tg(\theta_1)y_{b1}}{tg(\theta_2) - tg(\theta_1)} + (1-\alpha)\dfrac{x_{b1} - x_{b3} + tg(\theta_3)y_{b3} - tg(\theta_1)y_{b1}}{tg(\theta_3) - tg(\theta_1)} \end{cases}$$

The x-axis is perpendicular to the y-axis, $(x_{b1}, y_{b1})$ is location coordinates of the base station of the serving cell, $(x_{b2}, y_{b2})$ is location coordinates of a base station of the first neighboring cell, $(x_{b3}, y_{b3})$ is location coordinates of a base station of the second neighboring cell, $\theta_1$ is the first angle, $\theta_2$ is an angle of the terminal device relative to the first neighboring cell, $\theta_3$ is an angle of the terminal device relative to the second neighboring cell, and $\alpha$ represents a weight coefficient.

In some embodiments, $\alpha$ is determined from the following formula.

$$\alpha = \frac{RSRP_1}{RSRP_1 + RSRP_2}$$

$RSRP_1$ represents a RSRP value of measurement performed by the terminal device on the base station of the first neighboring cell, and $RSRP_2$ represents a RSRP value of measurement performed by the terminal device on the base station of the second neighboring cell.

Figure 9:
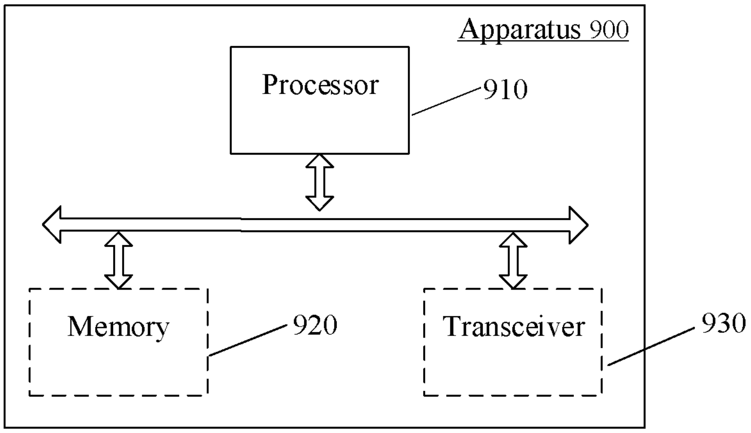
FIG. 9 is a schematic structural diagram of a communications apparatus according to an embodiment of this present disclosure.

FIG. 9 is a schematic structural diagram of a communications apparatus according to an embodiment of this present disclosure. The dotted line in FIG. 9 indicates that the unit or module is optional. The apparatus 900 may be configured to implement the method described in the foregoing method embodiments. The apparatus 900 may be a chip, a terminal device, a network device, or a positioning device. For example, the apparatus 900 may be a base station.

The apparatus 900 may include one or more processors 910. The processor 910 may support the apparatus 900 to implement the method described in the foregoing method embodiments. The processor 910 may be a general-purpose processor or a dedicated processor. For example, the processor may be a central processing unit (CPU). Alternatively, the processor may be another general-purpose processor, a digital signal processor (DSP), an present disclosure-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like.

The apparatus 900 may further include one or more memories 920. The memory 920 stores a program, and the program is executable by the processor 910, so that the processor 910 executes the method described in the foregoing method embodiments. The memory 920 may be independent of or integrated into the processor 910.

The apparatus 900 may further include a transceiver 930. The processor 910 may communicate with another device or chip via the transceiver 930. For example, the processor 910 may perform data transceiver with another device or chip by using the transceiver 930.

An embodiment of this present disclosure further provides a computer readable storage medium, configured to store a program. The computer readable storage medium may be applied to the terminal or the network device provided in the embodiments of this present disclosure, and the program causes the computer to execute the method executed by the terminal or the network device in the embodiments of this present disclosure.

An embodiment of this present disclosure further provides a computer program product. The computer program product includes a program. The computer program product may be applied to the terminal or the network device provided in the embodiments of this present disclosure, and the program causes the computer to execute the method executed by the terminal or the network device in the embodiments of this present disclosure.

An embodiment of this present disclosure further provides a computer program. The computer program may be applied to the terminal or the network device provided in the embodiments of this present disclosure, and the computer program causes the computer to execute the methods executed by the terminal or the network device in the embodiments of this present disclosure.

It should be understood that the terms "system" and "network" in this present disclosure may be used interchangeably. In addition, the terms used in this present disclosure are merely to explain specific embodiments of this present disclosure, and are not intended to limit this present disclosure. The terms "first", "second", "third", and "fourth" in the specification, claims, and accompanying drawings of this present disclosure are used to distinguish between different objects, and are not used to describe a specific sequence. In addition, the terms "include" and "have" and any variations thereof are intended to cover the inclusion of non-exclusive.

In the embodiments of this present disclosure, the mentioned "indication" may be a direct indication, an indirect indication, or an association relationship. For example, A indicates B, which may indicate that A directly indicates B, for example, B may be obtained based on A. Alternatively, it may indicate that A indirectly indicates B, for example, A indicates C, and B may be obtained based on C. It may further indicate that there is an association relationship between A and B.

In the embodiments of this present disclosure, "B corresponding to A" indicates that B is associated with A, and B may be determined according to A. However, it should be further understood that determining B according to A does not mean determining B according to A only, and may further determine B according to A and/or other information.

In the embodiments of this present disclosure, the term "correspondence" may indicate that there is a direct correspondence or an indirect correspondence between the two, or may indicate an association relationship between the two, or may indicate a relationship with indication, configuration, and configuration.

In the embodiments of this present disclosure, "predefined" or "pre-configured" may be implemented in a manner in which a corresponding code, table, or other related information may be pre-stored in a device (for example, a terminal device or a network device). A specific implementation manner of this present disclosure is not limited. For example, a predefined definition may refer to a definition in a protocol.

In the embodiments of this present disclosure, the "protocol" may refer to a standard protocol in the communications field, for example, may include an LTE protocol, an NR protocol, and a related protocol applied to a future communications system. This is not limited in this present disclosure.

In the embodiments of this present disclosure, the term "and/or" is merely an association relationship that describes an associated object, and indicates that three relationships may exist. For example, A and/or B may indicate that A exists separately, A and B exist simultaneously, and B exists separately. In addition, the character "/" in this specification generally indicates that the associated object is a "or" relationship.

In various embodiments of this present disclosure, a sequence number of the foregoing processes does not mean a sequence of execution. The execution sequence of the processes should be determined according to functions and internal logic of the processes, and should not constitute any limitation on an implementation process of the embodiments of this present disclosure.

In the embodiments provided in this present disclosure, it should be understood that the disclosed system, apparatus, and method may be implemented in another manner. For example, the described apparatus embodiment is merely an example. For example, the unit division is merely logical function division. In actual implementation, there may be another division manner. For example, multiple units or components may be combined or integrated into another system, or some features may be ignored or not performed. On the other hand, the displayed or discussed mutual coupling or direct coupling or communication connection may be through some interfaces, indirect coupling or communication connection of the apparatus or unit, and may be in an electrical, mechanical, or other form.

The units described as separate parts may or may not be physically separate, and parts described as units may or may not be physical units, may be located in one place, or may be distributed on multiple network units. Some or all of the units may be selected according to an actual requirement to implement the objectives of the solutions in the embodiments.

In addition, functional units in the embodiments of this present disclosure may be integrated into one processing unit, or each unit may exist separately physically, or two or more units may be integrated into one unit.

In the foregoing embodiments, software, hardware, firmware, or any combination thereof may be implemented in whole or in part. When software is used, the solution may be implemented in full or in part in the form of a computer program product. The computer program product includes one or more computer instructions. When the computer instructions are loaded and executed on the computer, a process or a function described in the embodiments of this present disclosure is completely or partially generated. The computer may be a general-purpose computer, a dedicated computer, a computer network, or another programmable apparatus. The computer instructions may be stored in a computer readable storage medium or transmitted from one computer readable storage medium to another computer readable storage medium. For example, the computer instructions may be transmitted from one website site, computer, server or data center to another website site, computer, server or data center in a wired (e.g., coaxial cable, optical fiber, digital subscriber line (DSL)) or wireless (e.g., infrared, wireless, microwave) manner. The computer readable storage medium may be any available medium that can be read by a computer or a data storage device such as a server or a data center that includes one or more available media integrations. The available media may be magnetic media (e.g., floppy disks, hard disks, magnetic tapes), optical media (e.g., digital video disc (DVD)), or semiconductor media (e.g., solid state disk (SSD)).

The foregoing descriptions are merely specific implementations of this present disclosure, but are not intended to limit the protection scope of this present disclosure. Any change or replacement readily figured out by those skilled in the art within the technical scope disclosed in this present disclosure shall fall within the protection scope of this present disclosure. Therefore, the protection scope of this present disclosure shall be subject to the protection scope of the claims.

What is claimed is:

1. A positioning method, comprising:

receiving, by a positioning device, an index of a first synchronization signal/physical broadcast channel (SSB) associated with a terminal device;

determining, by the positioning device based on an index of the first SSB, an SSB beam direction associated with the terminal device; and performing a positioning operation of the terminal device based on the SSB beam direction, and wherein the method comprises:

determining a first angle of the terminal device relative to a base station of a serving cell;

receiving, by the positioning device, an index of a second SSB from the terminal device, wherein the index of the second SSB is obtained by the terminal device when performing measurement for a neighboring cell;

determining, by the positioning device based on the index of the second SSB and a second correspondence, a second angle of the terminal device relative to a base station of the neighboring cell, wherein the second correspondence comprises a correspondence between an SSB index of the neighboring cell and the SSB beam direction; and determining, by the positioning device, location information of the terminal device based on the first angle, the second angle, location information of the base station of the serving cell, and location information of the base station of the neighboring cell, wherein the neighboring cell comprises a first neighboring cell and a second neighboring cell, and location coordinates (x, y) of the terminal device are:

$$\begin{cases} x = \alpha\frac{y_{b1} - y_{b2} + ctg(\theta_2)x_{b2} - ctg(\theta_1)x_{b1}}{ctg(\theta_2) - ctg(\theta_1)} + (1-\alpha)\frac{y_{b1} - y_{b3} + ctg(\theta_3)x_{b3} - ctg(\theta_1)x_{b1}}{ctg(\theta_3) - ctg(\theta_1)} \\ y = \alpha\frac{x_{b1} - x_{b2} + tg(\theta_2)y_{b2} - tg(\theta_1)y_{b1}}{tg(\theta_2) - tg(\theta_1)} + (1-\alpha)\frac{x_{b1} - x_{b3} + tg(\theta_3)y_{b3} - tg(\theta_1)y_{b1}}{tg(\theta_3) - tg(\theta_1)} \end{cases}$$

wherein an x-axis is perpendicular to a y-axis, ($x_{b1}$, $y_{b1}$) is location coordinates of the base station of the serving cell, ($x_{b2}$, $y_{b2}$) is location coordinates of a base station of the first neighboring cell, ($x_{b3}$, $y_{b3}$) is location coordinates of a base station of the second neighboring cell, $\theta_1$ is the first angle, $\theta_2$ is an angle of the terminal device relative to the first neighboring cell, $\theta_3$ is an angle of the terminal device relative to the second neighboring cell, $\alpha$ represents a weight coefficient, and $0 \le \alpha \le 1$.

2. The method of claim 1, wherein the SSB beam direction is determined based on a first correspondence, wherein the first correspondence comprises a correspondence between a plurality of SSB indexes of a serving cell and the respective SSB beam direction.

3. The method of claim 1, wherein the index of the first SSB is received from the terminal device.

4. The method of claim 1, further comprising:

determining, by the positioning device based on the index of the first SSB and a first correspondence, a first angle of the terminal device relative to a base station of a serving cell, wherein the first correspondence comprises a correspondence between an SSB index of the serving cell and an SSB beam direction.

5. The method of claim 1, further comprising:

receiving, by the positioning device, an index of a second SSB from the terminal device, wherein the index of the second SSB is obtained by the terminal device when performing measurement for a neighboring cell.

6. The method of claim 5, further comprising:

determining, by the positioning device based on the index of the second SSB and a second correspondence, a second angle of the terminal device relative to a base station of the neighboring cell, wherein the second correspondence comprises a correspondence between an SSB index of the neighboring cell and the SSB beam direction.

7. The method of claim 6, further comprising:

receiving, by the positioning device, location information of a base station of a serving cell, and location information of the base station of the neighboring cell.

8. The method according to claim 1, wherein a is determined from the following formula:

$$\alpha = \frac{RSRP_1}{RSRP_1 + RSRP_2}$$

wherein $RSRP_1$ represents a RSRP value of measurement performed by the terminal device on the base station of the first neighboring cell, and $RSRP_2$ represents a RSRP value of measurement performed by the terminal device on the base station of the second neighboring cell.

9. An apparatus, comprising:

at least one processor; and one or more non-transitory computer-readable storage media coupled to the at least one processor and storing programming instructions for execution by the at least one processor, wherein the programming instructions, when executed, cause the apparatus to perform operations comprising:

receiving an index of a first synchronization signal/physical broadcast channel (SSB) associated with a terminal device;

determining, based on an index of the first SSB, an SSB beam direction associated with the terminal device; and performing a positioning operation of the terminal device based on the SSB beam direction, and wherein the operations comprise:

determining a first angle of the terminal device relative to a base station of a serving cell;

receiving an index of a second SSB from the terminal device, wherein the index of the second SSB is obtained by the terminal device when performing measurement for a neighboring cell;

determining, based on the index of the second SSB and a second correspondence, a second angle of the terminal device relative to a base station of the neighboring cell, wherein the second correspondence comprises a correspondence between an SSB index of the neighboring cell and the SSB beam direction; and determining location information of the terminal device based on the first angle, the second angle, location information of the base station of the serving cell, and location information of the base station of the neighboring cell, wherein the neighboring cell comprises a first neighboring cell and a second neighboring cell, and location coordinates (x, y) of the terminal device are:

$$\begin{cases} x = \alpha\frac{y_{b1} - y_{b2} + ctg(\theta_2)x_{b2} - ctg(\theta_1)x_{b1}}{ctg(\theta_2) - ctg(\theta_1)} + (1-\alpha)\frac{y_{b1} - y_{b3} + ctg(\theta_3)x_{b3} - ctg(\theta_1)x_{b1}}{ctg(\theta_3) - ctg(\theta_1)} \\ y = \alpha\frac{x_{b1} - x_{b2} + tg(\theta_2)y_{b2} - tg(\theta_1)y_{b1}}{tg(\theta_2) - tg(\theta_1)} + (1-\alpha)\frac{x_{b1} - x_{b3} + tg(\theta_3)y_{b3} - tg(\theta_1)y_{b1}}{tg(\theta_3) - tg(\theta_1)} \end{cases}$$

wherein an x-axis is perpendicular to a y-axis, ($x_{b1}$, $y_{b1}$) is location coordinates of the base station of the serving cell, ($x_{b2}$, $y_{b2}$) is location coordinates of a base station of the first neighboring cell, ($x_{b3}$, $y_{b3}$) is location coordinates of a base station of the second neighboring cell, $\theta_1$ is the first angle, $\theta_2$ is an angle of the terminal device relative to the first neighboring cell, $\theta_3$ is an angle of the terminal device relative to the second neighboring cell, $\alpha$ represents a weight coefficient, and $0 \le \alpha \le 1$.

10. The apparatus of claim 9, wherein the SSB beam direction is determined based on a first correspondence, wherein the first correspondence comprises a correspondence between a plurality of SSB indexes of a serving cell and the respective SSB beam direction.

11. The apparatus of claim 9, wherein the index of the first SSB is received from the terminal device.

12. The apparatus of claim 9, the operations further comprising:

determining, based on the index of the first SSB and a first correspondence, a first angle of the terminal device relative to a base station of a serving cell, wherein the first correspondence comprises a correspondence between an SSB index of the serving cell and an SSB beam direction.

13. The apparatus of claim 9, the operations further comprising:

receiving an index of a second SSB from the terminal device, wherein the index of the second SSB is obtained by the terminal device when performing measurement for a neighboring cell.

14. The apparatus of claim 13, the operations further comprising:

determining, based on the index of the second SSB and a second correspondence, a second angle of the terminal device relative to a base station of the neighboring cell, wherein the second correspondence comprises a correspondence between an SSB index of the neighboring cell and the SSB beam direction.

15. The apparatus of claim 14, the operations further comprising:

receiving location information of a base station of a serving cell, and location information of the base station of the neighboring cell.

16. One or more non-transitory computer-readable media storing computer instructions, that when executed by one or more processors, cause a computer to perform operations comprising:

receiving an index of a first synchronization signal/physical broadcast channel (SSB) associated with a terminal device;

determining, based on an index of the first SSB, an SSB beam direction associated with the terminal device; and performing a positioning operation of the terminal device based on the SSB beam direction, and wherein the operations comprise:

determining a first angle of the terminal device relative to a base station of a serving cell;

receiving an index of a second SSB from the terminal device, wherein the index of the second SSB is obtained by the terminal device when performing measurement for a neighboring cell;

determining, based on the index of the second SSB and a second correspondence, a second angle of the terminal device relative to a base station of the neighboring cell, wherein the second correspondence comprises a correspondence between an SSB index of the neighboring cell and the SSB beam direction; and determining location information of the terminal device based on the first angle, the second angle, location information of the base station of the serving cell, and location information of the base station of the neighboring cell, wherein the neighboring cell comprises a first neighboring cell and a second neighboring cell, and location coordinates (x, y) of the terminal device are:

$$\begin{cases} x = \alpha\dfrac{y_{b1} - y_{b2} + ctg(\theta_2)x_{b2} - ctg(\theta_1)x_{b1}}{ctg(\theta_2) - ctg(\theta_1)} + (1-\alpha)\dfrac{y_{b1} - y_{b3} + ctg(\theta_3)x_{b3} - ctg(\theta_1)x_{b1}}{ctg(\theta_3) - ctg(\theta_1)} \\ y = \alpha\dfrac{x_{b1} - x_{b2} + tg(\theta_2)y_{b2} - tg(\theta_1)y_{b1}}{tg(\theta_2) - tg(\theta_1)} + (1-\alpha)\dfrac{x_{b1} - x_{b3} + tg(\theta_3)y_{b3} - tg(\theta_1)y_{b1}}{tg(\theta_3) - tg(\theta_1)} \end{cases}$$

wherein an x-axis is perpendicular to a y-axis, $(x_{b1}, y_{b1})$ is location coordinates of the base station of the serving cell, $(x_{b2}, y_{b2})$ is location coordinates of a base station of the first neighboring cell, $(x_{b3}, y_{b3})$ is location coordinates of a base station of the second neighboring cell, $\theta_1$ is the first angle, $\theta_2$ is an angle of the terminal device relative to the first neighboring cell, $\theta_3$ is an angle of the terminal device relative to the second neighboring cell, $\alpha$ represents a weight coefficient, and $0 \leq \alpha \leq 1$.

17. The one or more non-transitory computer-readable media of claim 16, wherein the SSB beam direction is determined based on a first correspondence, wherein the first correspondence comprises a correspondence between a plurality of SSB indexes of a serving cell and the respective SSB beam direction.

18. The one or more non-transitory computer-readable media of claim 17, wherein the index of the first SSB is received from the terminal device.

19. The one or more non-transitory computer-readable media of claim 17, the operations further comprising:

determining, based on the index of the first SSB and a first correspondence, a first angle of the terminal device relative to a base station of a serving cell, wherein the first correspondence comprises a correspondence between an SSB index of the serving cell and an SSB beam direction.

20. The one or more non-transitory computer-readable media of claim 17, the operations further comprising:

receiving an index of a second SSB from the terminal device, wherein the index of the second SSB is obtained by the terminal device when performing measurement for a neighboring cell.

* * * * *